(12) United States Patent
Nakamura

(10) Patent No.: US 9,885,890 B2
(45) Date of Patent: Feb. 6, 2018

(54) FARADAY ROTATOR

(71) Applicant: SUMITOMO METAL MINING CO., LTD., Tokyo (JP)

(72) Inventor: Nobuo Nakamura, Ome (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/910,807

(22) PCT Filed: Jul. 22, 2014

(86) PCT No.: PCT/JP2014/069302
§ 371 (c)(1),
(2) Date: Feb. 8, 2016

(87) PCT Pub. No.: WO2015/037332
PCT Pub. Date: Mar. 19, 2015

(65) Prior Publication Data
US 2016/0195737 A1    Jul. 7, 2016

(30) Foreign Application Priority Data
Sep. 10, 2013 (JP) ................. 2013-187018

(51) Int. Cl.
*G02B 5/30* (2006.01)
*G02F 1/09* (2006.01)
(Continued)

(52) U.S. Cl.
CPC .......... *G02F 1/093* (2013.01); *G02B 27/286* (2013.01); *G02F 1/0036* (2013.01); *G02F 1/0102* (2013.01); *G02F 1/09* (2013.01)

(58) Field of Classification Search
CPC ...... G02F 1/093; G02F 1/0036; G02F 1/0102; G02F 1/09
(Continued)

(56) References Cited

U.S. PATENT DOCUMENTS 5,965,287 A * 10/1999 Suzuki ............... H01F 1/346
252/62.56
6,128,423 A * 10/2000 Shirai ............... G01R 33/0322
250/227.11
(Continued)

FOREIGN PATENT DOCUMENTS

JP    2000-66160        3/2000
JP    2006-215491 A1    8/2006
(Continued)

OTHER PUBLICATIONS

English machine translation of JP 2010134066 A.*
International Search Report for International Application No. PCT/JP2014/069302 dated Sep. 30, 2014.

*Primary Examiner* — Thomas K Pham
*Assistant Examiner* — Nicholas R Pasko
(74) *Attorney, Agent, or Firm* — Kratz, Quintos & Hanson, LLP

(57) ABSTRACT

A Faraday rotator excellent in productivity and also hardly causing an isolation function of an optical isolator to deteriorate even when the Faraday rotator is used in a high-power laser with a wavelength of 1.1 μm or less and an output of 1 W or more. The Faraday rotator comprises a non-magnetic garnet substrate; bismuth-substituted rare-earth iron garnet films grown respectively on both surfaces of the non-magnetic garnet substrate by a liquid phase epitaxial method; and sapphire crystal substrates bonded respectively to outer surfaces of the bismuth-substituted rare-earth iron garnet films, and configured to dissipate heat. The bismuth-substituted rare-earth iron garnet films has an absorption coefficient of 9 $cm^{-1}$ or less for light at a wavelength of 1.06 μm, and that the bismuth-substituted rare-earth iron garnet films grown on the respective surfaces of the non-magnetic garnet substrate differ from each other in film thickness by 10 μm or less.

4 Claims, 1 Drawing Sheet

(51) Int. Cl.
  *G02B 27/28* (2006.01)
  *G02F 1/00* (2006.01)
  *G02F 1/01* (2006.01)
(58) Field of Classification Search
  USPC .................................... 359/484.02, 484.03
  See application file for complete search history.

(56) References Cited

U.S. PATENT DOCUMENTS

| | | | |
|---|---|---|---|
| 6,770,223 B1 * | 8/2004 | Abbott | G02F 1/09 |
| | | | 252/582 |
| 2006/0238864 A1 * | 10/2006 | Iida | G02F 1/093 |
| | | | 359/484.03 |
| 2011/0069387 A1 * | 3/2011 | Iida | G02B 6/2817 |
| | | | 359/484.03 |
| 2013/0224500 A1 * | 8/2013 | Oosumi | C30B 19/12 |
| | | | 428/446 |

FOREIGN PATENT DOCUMENTS

| | | | | |
|---|---|---|---|---|
| JP | 2006292799 A * | 10/2006 | | |
| JP | 2010-134066 A1 | 6/2010 | | |
| JP | 2010134066 A * | 6/2010 | | |
| JP | 2010-150116 A1 | 7/2010 | | |
| JP | 2011-90291 A1 | 5/2011 | | |
| JP | 2012-188303 A1 | 10/2012 | | |
| WO | WO 2012073670 A1 * | 6/2012 | ............. | C30B 19/12 |
| WO | WO 2012073671 A1 * | 6/2012 | ............. | C30B 19/12 |

* cited by examiner

FARADAY ROTATOR

TECHNICAL FIELD

The present invention relates to an optical isolator utilized as a countermeasure against reflected return light of a high-power laser used in optical communications and processing. Particularly, the present invention relates to an improvement in a Faraday rotator constituting a part of the optical isolator.

BACKGROUND ART

In a laser such as a semiconductor laser utilized in optical communications or a solid-state laser utilized in laser processing or the like, when light reflected by an optical surface or a work surface outside a laser resonator returns to the laser element, the laser oscillation is destabilized. The destabilized laser oscillation causes a signal noise in the optical communications, or may destroy the laser element in the laser for processing. In order to block reflected return light so that the light cannot return to the laser element, an optical isolator is used. Normally, an optical isolator is constituted of a Faraday rotator, a polarizer, an analyzer, and a permanent magnet.

Heretofore, a terbium gallium garnet crystal (hereinafter referred to as TGG) and a terbium aluminium garnet crystal (hereinafter referred to as TAG) have been used for a Faraday rotator to be incorporated in an optical isolator for a high-power laser.

However, the TGG and the TAG each have a small Faraday rotation coefficient per unit length. Hence, in order to obtain a polarization rotation angle of 45 degrees so as to function as an optical isolator, the TGG or the TAG needs to have a long optical path length, and a large crystal having a length as long as approximately 6 cm has to be used. Moreover, in order to obtain a high optical isolation, it is necessary to apply a uniform and large magnetic field to the crystal, and strong and large magnets have been used. For these reasons, such optical isolators have been large in size. Further, since the optical path length is long, the shape of beams from the laser is distorted in the crystal, which necessitates an optical system for correcting the distortion, in some cases. Furthermore, since the TGG is expensive, there is a demand for a small and inexpensive Faraday rotator.

Meanwhile, a bismuth-substituted rare-earth iron garnet crystal film (hereinafter referred to as RIG film), which is exclusively used in the field of optical communications, has a Faraday rotation coefficient per unit length significantly larger than those of the TGG and the TAG. The use of an RIG film can greatly reduce the size of an optical isolator. However, it is known that when the wavelength of light used is shortened from the 1.3 µm region or 1.55 µm region, which are exclusively employed in the field of optical communications, to around 1.1 µm, which is employed for a laser for processing, a large amount of light is absorbed by iron ions in the RIG film. This light absorption causes the temperature to rise, consequently causing the performance deterioration.

In this respect, Patent Documents 1 and 2 have proposed methods for solving the problem of temperature rise of an RIG film.

First, Patent Document 1 proposes a method in which an RIG film is grown on one surface of a non-magnetic garnet substrate, and then the RIG film is used as a Faraday rotator with the non-magnetic garnet substrate. According to this method, heat is dissipated through the non-magnetic garnet substrate, and thus the temperature rise of the RIG film can be prevented. Note that, in the Faraday rotator having such a structure, light is reflected at an interface between the RIG film and the non-magnetic garnet substrate. However, the reflected light can be handled in the same manner as for light returned from the outside of the optical isolator because the RIG film is disposed at the laser element (light source) side, so that when the reflected light passes through the RIG film, the polarization rotates by 90 degrees. Hence, the isolation performance does not decrease.

Moreover, Patent Document 2 proposes a method in which a non-magnetic garnet substrate used to grow an RIG film is removed by grinding and polishing processes, and then heat dissipation substrates made of a sapphire crystal or a rutile crystal are respectively bonded to both surfaces of the RIG film to thereby prevent temperature rise of the RIG film.

CONVENTIONAL ART DOCUMENTS

Patent Documents

Patent Document 1: Japanese Patent Application Publication No. 2000-66160 (see claim 1)
Patent Document 2: Japanese Patent Application Publication No. 2006-215491 (see claim 1)

SUMMARY OF THE INVENTION

Problems to be Solved by the Invention

Meanwhile, the method proposed in Patent Document 1 has a problem that the RIG film still causes temperature rise. This is because the thermal conductivity of the non-magnetic garnet substrate is approximately 7 W/m·K and is not so high, and heat cannot be dissipated sufficiently through the non-magnetic garnet substrate when a high-power laser beam enters the Faraday rotator.

On the other hand, in the method proposed in Patent Document 2, the sapphire crystal substrates have a high thermal conductivity of 40 W/m·K, making it possible to prevent temperature rise of the RIG film. However, the method has another problem that the productivity of the Faraday rotator is low. To be more specific, the production of the Faraday rotator proposed in Patent Document 2 requires the steps of: growing an RIG film on a non-magnetic garnet substrate, removing the non-magnetic garnet substrate by grinding and polishing processes, and then subjecting the RIG film to a polishing process until the RIG film has a Faraday rotation angle of 45°. Moreover, since it is necessary to perform the grinding and polishing processes for removing the non-magnetic garnet substrate, the productivity of this method is inferior to that of Patent Document 1. In addition, the RIG film is likely to be cracked by the required polishing process because the RIG film is polished to the following thickness in the absence of the non-magnetic garnet substrate. Specifically, while an RIG film needs to have a thickness of approximately 400 µm for light at wavelengths for optical communications (specifically, the 1.3 µm region or the 1.55 µm region), an RIG film needs to have a thickness of 200 µm or less for light at a wavelength of around 1.1 µm employed for a laser for processing. In such thin polishing process, even when an RIG film is carefully polished, the film is likely to be cracked from minute crystal defect. This brings about a problem that it takes a long time to complete the polishing process. Furthermore, if the polishing rate is increased to shorten the processing time, cracking notably occurs, resulting in a problem of yield decrease.

The present invention has been made in view of such problems as described above. An object of the present invention is to provide a Faraday rotator excellent in productivity and also hardly causing an isolation function of an optical isolator to deteriorate even when the Faraday rotator is used in a high-power laser with a wavelength of 1.1 µm or less and an output of 1 W or more.

Means for Solving the Problems

Accordingly, the present inventor has earnestly studied to solve the above the problems. As a result, the inventor has found out that when an Faraday rotator is obtained by growing RIG films respectively on both surfaces of a non-magnetic garnet substrate by a liquid phase epitaxial method, and bonding a sapphire crystal substrates as heat dissipation substrates to outer surfaces of the grown RIG films, the Faraday rotator is excellent in mass productivity and capable of preventing temperature rise of the RIG films even when a high-power laser beam enters at a wavelength of 1.1 µm or less and an output of 1 W or more.

Specifically, a first aspect according to the present invention is a Faraday rotator constituting a part of an optical isolator, comprising:

a non-magnetic garnet substrate;

bismuth-substituted rare-earth iron garnet films grown respectively on both surfaces of the non-magnetic garnet substrate by a liquid phase epitaxial method; and sapphire crystal substrates bonded respectively to outer surfaces of the bismuth-substituted rare-earth iron garnet films, and configured to dissipate heat, the Faraday rotator characterized in that the bismuth-substituted rare-earth iron garnet films have an absorption coefficient of 9 cm' or less for light at a wavelength of 1.06 µm, and the bismuth-substituted rare-earth iron garnet films grown on the respective surfaces of the non-magnetic garnet substrate differ from each other in film thickness by 10 µm or less.

Moreover, a second aspect of the present invention is the Faraday rotator according to the first aspect, characterized in that the bismuth-substituted rare-earth iron garnet films grown on the respective surfaces of the non-magnetic garnet substrate differ from each other in film thickness by 4 µm or less.

A third aspect of the present invention is the Faraday rotator according to the first aspect or the second aspect, characterized in that a Faraday rotation angle is 45°±2° for the wavelength of light used.

Effects of the Invention

The Faraday rotators according to the first aspect to the third aspect of the present invention each include: the non-magnetic garnet substrate; the bismuth-substituted rare-earth iron garnet films grown respectively on both surfaces of the non-magnetic garnet substrate by a liquid phase epitaxial method; and the sapphire crystal substrates bonded respectively to outer surfaces of the bismuth-substituted rare-earth iron garnet films, and configured to dissipate heat. The Faraday rotators are characterized in that the bismuth-substituted rare-earth iron garnet films have an absorption coefficient of 9 cm$^{-1}$ or less for light at a wavelength of 1.06 µm, and that the bismuth-substituted rare-earth iron garnet films grown on the respective surfaces of the non-magnetic garnet substrate differ from each other in film thickness by 10 µm or less.

Moreover, when the Faraday rotators according to the first aspect to the third aspect of the present invention are used in a high-power laser with a wavelength of 1.1 µm or less and an output of 1 W or more, the temperature of the bismuth-substituted rare-earth iron garnet films hardly rises by the action of the heat-dissipating sapphire crystal substrates which are transparent, excellent in thermal conductivity, and provided on the outer surfaces of the bismuth-substituted rare-earth iron garnet films. In addition, the growth time according to the liquid phase epitaxial method for growing the bismuth-substituted rare-earth iron garnet films on the respective surfaces of the non-magnetic garnet substrate is approximately half of those according to the methods described in Patent Documents 1 and 2. Further, in contrast to the method described in Patent Document 2, it is possible to omit the grinding and polishing processes for removing the non-magnetic garnet substrate. Furthermore, in the presence of the non-magnetic garnet substrate, the bismuth-substituted rare-earth iron garnet films grown on the respective surfaces thereof can be subjected to the polishing process.

Thus, the present invention makes it possible, as an effect, to provide a Faraday rotator excellent in productivity and capable of maintaining a high isolation effect when applied to an optical isolator of a high-power laser with a wavelength of 1.1 µm or less and an output of 1 W or more.

MODES FOR PRACTICING THE INVENTION

Figure 1:
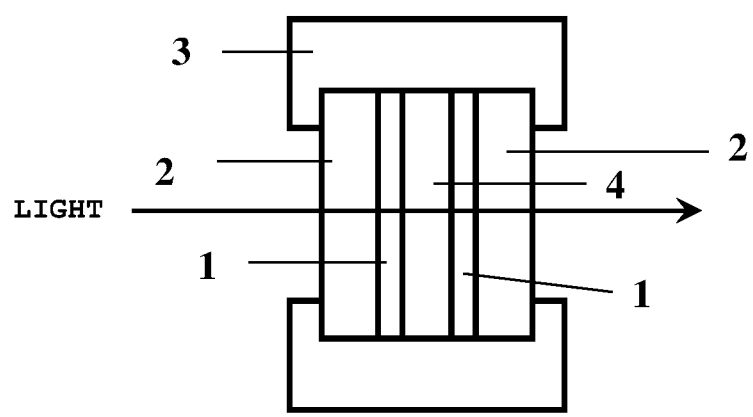
FIG. 1 is a cross-sectional view of a Faraday rotator according to the present invention.

Hereinafter, an embodiment of the present invention will be described in detail.

First of all, a Faraday rotator according to the present invention is, as described above, constituted of: a non-magnetic garnet substrate; bismuth-substituted rare-earth iron garnet films grown respectively on both surfaces of the non-magnetic garnet substrate by a liquid phase epitaxial method; and sapphire crystal substrates bonded respectively to outer surfaces of the bismuth-substituted rare-earth iron garnet films, and configured to dissipate heat. The Faraday rotator is characterized in that the bismuth-substituted rare-earth iron garnet films have an absorption coefficient of 9 cm$^{-1}$ or less for light at a wavelength of 1.06 µm, and that the bismuth-substituted rare-earth iron garnet films grown on the respective surfaces of the non-magnetic garnet substrate differ from each other in film thickness by 10 µm or less.

First, the bismuth-substituted rare-earth iron garnet films (RIG films) grown on the respective surfaces of the non-magnetic garnet substrate are desirably the same in terms of film thickness. A slight difference in film thickness due to a polishing process or the like is acceptable, and it is necessary that the acceptable difference in film thickness should be 10 µm or less, preferably 4 µm or less. If the difference in film thickness exceeds 10 µm, the non-magnetic garnet substrate on which the RIG films are formed is warped, and the heat dissipating effect of a thicker portion of the resulting RIG films deteriorates, causing the temperature rise. This increases the absorption coefficient of the RIG films, the insertion loss increases, and stress-induced birefringence due to the imbalance in temperature causes the extinction ratio to deteriorate. Consequently, the performance as an optical isolator deteriorates. Incidentally, if there is a difference in film thickness between the RIG films, the RIG film having the smaller film thickness is preferably disposed at the light incident side. This is because this arrangement allows the two RIG films (the two RIG films means the RIG films grown respectively on both surfaces of the non-magnetic garnet substrate) to absorb the same amount of light.

Moreover, it is necessary that the RIG films should have an absorption coefficient of 9 cm$^{-1}$ or less for light at a wavelength of 1.06 μm. In the case where the RIG films grown on the respective surfaces of the non-magnetic garnet substrate have the same film thickness, if the absorption coefficient is increased, the difference in the amount of light absorbed is increased between the RIG film at the incident side and the RIG film at the emission side. Consequently, stress-induced birefringence due to the imbalance in temperature causes the extinction ratio to deteriorate.

Further, in the Faraday rotator according to the present invention, the Faraday rotation angle is preferably 45° for the wavelength of light used. This is because if the Faraday rotation angle is out of the range of 45°±2°, the performance as an optical isolator deteriorates.

The growth time required to obtain the RIG films having a desired film thickness by a liquid phase epitaxial method in the Faraday rotator according to the present invention is half of that according to the method described in Patent Document 1 in which an RIG film is grown only on one surface of a non-magnetic garnet substrate. This is because the RIG films are epitaxially grown on both surfaces of the non-magnetic garnet substrate at the same time in the present invention. Moreover, the processing time after the growth also is ⅓ of the entire process for the Faraday rotator described in Patent Document 2 because the present invention does not include the step for eliminating the non-magnetic garnet substrate. Further, in the method described in Patent Document 2, the polishing process has to be performed on an RIG film, which is susceptible to brittle fracture, alone (because the non-magnetic garnet substrate is removed). In contrast, in the Faraday rotator according to the present invention, the RIG films are processed in the presence of the non-magnetic garnet substrate, which is not susceptible to brittle fracture, so that the RIG films are hardly cracked during the polishing process.

Meanwhile, when the Faraday rotator including the RIG films grown on the respective surfaces of the non-magnetic garnet substrate is to be incorporated into an optical isolator, there is such a concern that the isolation performance might be decreased by light reflected at an interface between the RIG film and the non-magnetic garnet substrate. In this regard, by disposing the Faraday rotator in such a manner that the Faraday rotator is inclined relative to the optical axis, the reflected light is never coupled into an optical fiber at the light source side, thereby making it possible to prevent the isolation performance from decreasing.

EXAMPLES

Hereinafter, Examples of the present invention will be described specifically together with Comparative Example.

Example 1

Preparation of Faraday Rotator

A $Gd_3(ScGa)_5O_{12}$ substrate (GSGG substrate) having a thickness of 400 μm was used as a non-magnetic garnet substrate 4 shown in FIG. 1. RIG films 1 having a composition represented by $Nd_{0.71}Gd_{1.10}Bi_{1.19}Fe_5O_{12}$ were grown respectively on both surfaces of the non-magnetic garnet substrate 4 by a liquid phase epitaxial growth method. Each of the RIG films 1 had a thickness of 100 μm. The RIG films 1 thus obtained had an absorption coefficient of 6.1 cm$^{-1}$ for light at a wavelength of 1.06 μm.

Next, the RIG films on the respective surfaces of the non-magnetic garnet substrate 4 were polished until the RIG films each had a thickness of 68 μm to achieve a Faraday rotation angle of 45° for light at a wavelength of 1.06 μm.

Next, reflection-free coating films (anti-reflection films) for an epoxy-based adhesive were provided respectively on both outer surfaces of the RIG films after the polishing process.

Moreover, sapphire crystal substrates each having a thickness of 750 μm were prepared as sapphire crystal substrates 2 shown in FIG. 1. A reflection-free coating film (anti-reflection film) for air was provided on one surface of each of the sapphire crystal substrates 2, while reflection-free coating films (anti-reflection films) for an epoxy-based adhesive were provided on the other surfaces of the sapphire crystal substrates 2.

Then, using an epoxy-based adhesive, the surfaces of the RIG films and the sapphire crystal substrates where the reflection-free coating films (anti-reflection films) for the epoxy-based adhesive had been provided were pasted on each other. After the epoxy-based adhesive was cured, the resultant was cut into a size of 2 mm square and fixed to a brass-made heat sink 3 shown in FIG. 1. Thus, a Faraday rotator was produced which included: the non-magnetic garnet substrate 4; the bismuth-substituted rare-earth iron garnet films 1, 1 grown on the respective surfaces of the non-magnetic garnet substrate 4; and the sapphire crystal substrates 2, 2 bonded to the respective outer surfaces of the bismuth-substituted rare-earth iron garnet films 1, 1, and configured to dissipate heat.

(Assembling of Optical Isolator)

Figure 2:
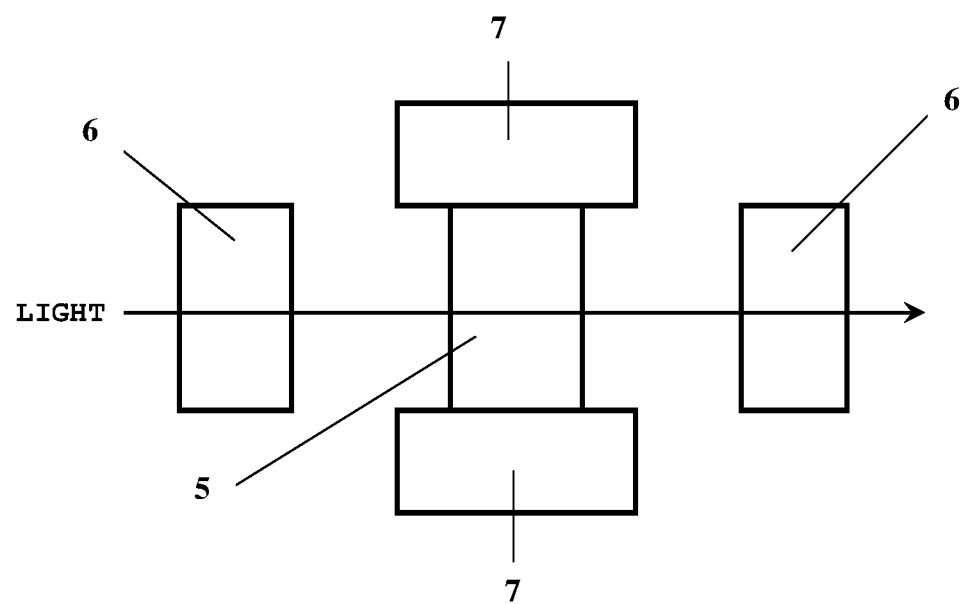
FIG. 2 is a cross-sectional view of an optical isolator according to Examples and Comparative Example incorporating the Faraday rotator of the present invention.

Next, using the Faraday rotator, an optical isolator shown in FIG. 2 was assembled. In FIG. 2, reference sign 5 denotes the Faraday rotator. The Faraday rotator 5 is the same as the Faraday rotator shown in FIG. 1. Moreover, one of reference signs 6 denotes a polarizer (the other is an analyzer), and reference sign 7 denotes a cylindrical permanent magnet.

Then, the optical isolator constituted of the Faraday rotator 5, the polarizer (analyzer) 6, 6, and the permanent magnet 7 was irradiated with a laser beam at a wavelength 1.06 μm and a beam diameter of 0.5 mm. The insertion loss and the isolation performance were measured using an optical system shown in FIG. 3 of Patent Document 2.

Note that the laser beam was set at two intensity levels of 20 mW and 2 W.

Table 1 shows the result.

Example 2

Preparation of Faraday Rotator

The RIG films 1 were grown in the same manner as in Example 1, except that the RIG films had a composition of $Nd_{0.82}Gd_{1.08}Bi_{1.10}Fe_5O_{12}$. The RIG films thus obtained had an absorption coefficient of 6.9 cm$^{-1}$ for light at a wavelength of 1.06 μm.

Next, the RIG films on the respective surfaces of the non-magnetic garnet substrate 4 were polished until the RIG films each had a thickness of 69 μm to achieve a Faraday rotation angle of 45° for light at a wavelength of 1.06 μm. Then, a Faraday rotator was prepared in the same manner as in Example 1.

(Assembling of Optical Isolator)

Using the Faraday rotator thus obtained, an optical isolator was assembled in the same manner as in Example 1. In addition, the properties of the optical isolator were evaluated in the same manner as in Example 1.

Table 1 shows the result.

Example 3

Preparation of Faraday Rotator

The RIG films 1 were grown in the same manner as in Example 1, except that the RIG films had a composition of $Nd_{01.24}Gd_{0.89}Bi_{0.87}Fe_5O_{12}$. The RIG films thus obtained had an absorption coefficient of 8.4 cm$^{-1}$ for light at a wavelength of 1.06 μm.

Next, the RIG films on the respective surfaces of the non-magnetic garnet substrate 4 were polished until the RIG films each had a thickness of 73 μm to achieve a Faraday rotation angle of 45° for light at a wavelength of 1.06 μm. Then, a Faraday rotator was prepared in the same manner as in Example 1.

(Assembling of Optical Isolator)

Using the Faraday rotator thus obtained, an optical isolator was assembled in the same manner as in Example 1. In addition, the properties of the optical isolator were evaluated in the same manner as in Example 1.

Table 1 shows the result.

Example 4

Preparation of Faraday Rotator

A Faraday rotator was prepared in the same manner as in Example 2, except that the RIG films 1 on the respective surfaces of the non-magnetic garnet substrate 4 were polished such that one of the RIG films 1 had a thickness of 71 μm, and the other RIG film 1 had a thickness of 67 μm (the difference in film thickness was 4 μm).

(Assembling of Optical Isolator)

Using the Faraday rotator thus obtained, an optical isolator was assembled in the same manner as in Example 1. In addition, the properties of the optical isolator were evaluated in the same manner as in Example 1.

Note that, in the evaluation, the RIG film having the smaller film thickness (film thickness of 67 μm) was disposed at the light incident side.

Table 1 shows the result.

Example 5

Preparation of Faraday Rotator

A Faraday rotator was prepared in the same manner as in Example 2, except that the RIG films 1 on the respective surfaces of the non-magnetic garnet substrate 4 were polished such that one of the RIG films 1 had a thickness of 74 μm, and the other RIG film 1 had a thickness of 64 μm (the difference in film thickness was 10 μm).

(Assembling of Optical Isolator)

Using the Faraday rotator thus obtained, an optical isolator was assembled in the same manner as in Example 1. In addition, the properties of the optical isolator were evaluated in the same manner as in Example 1.

Note that, in the evaluation, the RIG film having the smaller film thickness (film thickness of 64 μm) was disposed at the light incident side.

Table 1 shows the result.

Comparative Example 1

Preparation of Faraday Rotator

A $(GdCa)_3(GaMgZr)_5O_{12}$ substrate (SGGG substrate) having a thickness of 400 μm was used as the non-magnetic garnet substrate 4 shown in FIG. 1. The RIG films 1 having a composition represented by $Yb_{0.2}Tb_{1.6}Bi_{1.19}Fe_5O_{12}$ were grown respectively on both surfaces of the non-magnetic garnet substrate 4 by the liquid phase epitaxial growth method. Each of the RIG films 1 had a thickness of 100 μm. The RIG films 1 thus obtained had an absorption coefficient of 13.8 cm$^{-1}$ for light at a wavelength of 1.06 μm.

Next, the RIG films on the respective surfaces of the non-magnetic garnet substrate 4 were polished until the RIG films each had a thickness of 67 μm to achieve a Faraday rotation angle of 45° for light at a wavelength of 1.06 μm. Then, a Faraday rotator was prepared in the same manner as in Example 1.

(Assembling of Optical Isolator)

Using the Faraday rotator thus obtained, an optical isolator was assembled in the same manner as in Example 1. In addition, the properties of the optical isolator were evaluated in the same manner as in Example 1.

Table 1 shows the result.

TABLE 1

|  | Incident light intensity | Insertion loss (dB) | Isolation performance |
| --- | --- | --- | --- |
| Example 1 | 20 mW | 0.36 | 42 |
|  | 2 W | 0.76 | 35 |
| Example 2 | 20 mW | 0.41 | 42 |
|  | 2 W | 0.80 | 34 |
| Example 3 | 20 mW | 0.53 | 43 |
|  | 2 W | 0.89 | 33 |
| Example 4 | 20 mW | 0.41 | 42 |
|  | 2 W | 0.79 | 35 |
| Example 5 | 20 mW | 0.42 | 41 |
|  | 2 W | 0.81 | 34 |
| Comparative Example 1 | 20 mW | 0.75 | 43 |
|  | 2 W | 1.25 | 27 |

'Verification'

(1) Each of the optical isolators according to Examples 1 to 5 had an insertion loss of less than 1 dB even when the laser beam at 2 W entered, and the isolation performance was also secured at 30 dB or more.

(2) In contrast, the optical isolator according to Comparative Example 1 (the RIG films 1 had an absorption coefficient of 13.8 cm$^{-1}$ for light at a wavelength of 1.06 μm) had an insertion loss of 1 dB or more when the laser beam at 2 W entered, and the isolation performance also deteriorated to less than 30 dB. This verified that the properties of the optical isolator were significantly inferior.

POSSIBILITY OF INDUSTRIAL APPLICATION

The Faraday rotator according to the present invention is capable of effectively radiating heat generated in the RIG films. Thus, the Faraday rotator according to the present invention has such an industrial applicability that it is widely utilizable as a Faraday rotator for a high-power laser in optical communications, laser processing, and so forth.

REFERENCE SIGNS LIST

1: bismuth-substituted rare-earth iron garnet film (RIG film)
2: sapphire crystal substrate
3: heat sink
4: non-magnetic garnet substrate
5: Faraday rotator
6: polarizer (analyzer)
7: permanent magnet

The invention claimed is:

1. A Faraday rotator constituting a part of an optical isolator, the optical isolator comprising a light incident side and a light emission side, the Faraday rotator comprising:
   a non-magnetic garnet substrate;
   bismuth-substituted rare-earth iron garnet films grown respectively on both surfaces of the non-magnetic garnet substrate by a liquid phase epitaxial method; and
   sapphire crystal substrates bonded respectively to outer surfaces of the bismuth-substituted rare-earth iron garnet films, and configured to dissipate heat, the Faraday rotator characterized in that
   the bismuth-substituted rare-earth iron garnet films have an absorption coefficient of 9 cm$^{-1}$ or less for light at a wavelength of 1.06 μm,
   the bismuth-substituted rare-earth iron garnet films grown on the respective surfaces of the non-magnetic garnet substrate differ from each other, wherein a difference in film thickness is 10 μm or less, and
   the bismuth-substituted rare-earth iron garnet film having the smaller film thickness is disposed at a light incident side of the optical isolator.

2. The Faraday rotator according to claim 1, characterized in that the bismuth-substituted rare-earth iron garnet films grown on the respective surfaces of the non-magnetic garnet substrate differ from each other, wherein a difference in film thickness is 4 μm or less.

3. The Faraday rotator according to claim 1, characterized in that a Faraday rotation angle is 45°±2° for the wavelength of light used.

4. The Faraday rotator according to claim 2, characterized in that a Faraday rotation angle is 45°±2° for the wavelength of light used.

* * * * *